(12) United States Patent
Tomada et al.

(10) Patent No.: US 8,083,282 B2
(45) Date of Patent: Dec. 27, 2011

(54) DOOR OF A VEHICLE

(75) Inventors: Tokumitu Tomada, Mihara (JP); Masahiro Inui, Mihara (JP); Masaya Nishino, Mihara (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 64 days.

(21) Appl. No.: 12/582,754

(22) Filed: Oct. 21, 2009

(65) Prior Publication Data

US 2010/0257787 A1 Oct. 14, 2010

(30) Foreign Application Priority Data

Apr. 14, 2009 (JP) ................................ 2009-098208

(51) Int. Cl.
*B60J 5/10* (2006.01)

(52) U.S. Cl. ...................................... 296/146.8; 49/388

(58) Field of Classification Search ............... 296/146.1, 296/147, 146.5, 146.8; 49/382, 388; 16/82
See application file for complete search history.

(56) References Cited

U.S. PATENT DOCUMENTS

| | | | | |
|---|---|---|---|---|
| 4,216,725 | A * | 8/1980 | Hallam | 296/146.5 |
| 2008/0035793 | A1 * | 2/2008 | Obst | 244/129.5 |

FOREIGN PATENT DOCUMENTS

| | | | |
|---|---|---|---|
| JP | 4119528 | | 9/1966 |
| JP | 55031676 | A | 3/1980 |
| JP | 0510049 | U | 2/1993 |
| JP | 6-57957 | U | 8/1994 |
| JP | 2002339639 | A | 11/2002 |
| JP | 2007063789 | A | 3/2007 |

OTHER PUBLICATIONS

JP Office Action for 2009-098208, issued Aug. 18, 2011.

* cited by examiner

*Primary Examiner* — Lori Lyjak
(74) *Attorney, Agent, or Firm* — Kanesaka Berner and Partners LLP

(57) ABSTRACT

Described is an emergency door of a vehicle. An interior of the door and side part of front face of leading car are connected pivotally by an upper arm, lower arm, and first link bar so that a parallel linkage is composed, thereby enabling horizontal movement of the door. A stopper mechanism is composed such that an end of a second link bar is connecting pivotally to the first link bar, the bracket having an oblong hole is attached to a frame of a carbody, a pin fixed to the other end of the second link bar is received in the oblong hole, and the door can be stopped at its full open position when the pin contacts an end of the oblong hole.

5 Claims, 9 Drawing Sheets

Cross sectional view along line A-A

Cross sectional view along line B-B

Cross sectional view along line C-C

Cross sectional view along line D-D

Enlarged detail of a portion F

Cross sectional view of line G-G

Cross sectional view along line H-H

Cross sectional view of line I-I

DOOR OF A VEHICLE

RELATED APPLICATIONS

The present application is based on, and claims priority from, Japanese Application No. 2009-098208, filed Apr. 14, 2009, the disclosures of which is hereby incorporated by reference herein in its entirety.

BACKGROUND OF THE INVENTION

1. Field of the Invention

The present invention relates to an open/close mechanism of a door applicable to a variety of cars such as cars used in a guided transit system to open the door in a time of emergency to enable passengers to escape easily from the train.

2. Description of the Related Art

Emergency doors of cars used in a guided transit system are generally provided at the front or rear end of the vehicles. In these years, a medium capacity transit system, one of so-called new transit systems, in which guided train equipped with rubber tires travel along exclusive guideway, has become widespread. Full automatic operation of unmanned train is performed in many of these transit systems. In these systems, generally an automated vehicle or combination of automated vehicles runs along the exclusive guideway.

Emergency doors of the cars used in the new transit systems are single swing ones. The door must extend in straight line about hinges so that the door is opened by swinging it. Even when the front end of the leading car is of a curved surface, the door must extend in straight line about hinges, it protrudes inevitably from the curved surface.

In patent literature 1 (Japanese Laid-Open Patent Application No. 5-10049) is disclosed a single swing emergency door applied to vehicles such as buses.

In patent literature 2 (Japanese Laid-Open Patent Application No. 2002-339639) is disclosed an open/close mechanism of an emergency door of a vehicle used in the new transit systems, etc. According to the disclosure, an upper and lower hinge bracket are attached to the carbody and an upper and lower hinge bracket are attached to the emergency door, each of these hinge brackets has a vertical through hole to accommodate a hinge pin, two hinge pins inserted into the through holes of the upper hinge brackets are fixedly connected by an upper bent arm, and also two hinge pins inserted into the through holes of the lower hinge brackets are fixedly connected by a lower bent arm, and the door can be turned about the center line of each of the through holes of the upper and lower brackets attached to the carbody. With this configuration, the emergency door can be opened horizontally without moving it against gravitation.

In patent literature 3 (Japanese Laid-Open Patent Application No. 2007-63789) is disclosed a subsidiary open/close mechanism of door applied to a microbus, etc. The subsidiary open/close mechanism is composed such that the door is supported by two bent arms connected to the door at an upper and lower position rotatable with respect to the carbody and also supported by two link bars located laterally, so that the door can be moved horizontally to open/close the entrance of the bus.

The single swing emergency door of the patent literature 1 is opened outward and requires a certain space outside the carbody to open the door. Therefore, when it is provided at an end of a coupled with another vehicle, the door may interfere with the end face of the adjacent vehicle when opening the door. Further, when the emergency door is attached to a curved profile of front face of leading car, hinges protrude outside the body, and sealing of the mating part of the door and the carbody is difficult, which tends to induce occurrence of ingress of rainwater. Further, when the front end of a leading car is of a streamlined form having a sweepback angle, the hinge line must be slanted, so it is inevitable that the emergency door is a one opened upward and fairy large force is required to open the emergency door against gravitation.

The emergency door disclosed in the patent literature 2 is moved horizontally along the outer face of the carbody of leading car, so it has an advantage that not large space is required at outside the carbody as compared with the case of the single swing door. However, supporting of the door by the arms is not stable, the door tends to rotate, and there are concerns that the door impinges against the carbody and damages the carbody.

In the mechanism disclosed in the patent literature 3, the door is supported by four supporting bars, i.e. two bent arms connected to upper and lower part of the door and two lateral link bars, so its configuration is complicated, and as a stopper mechanism of the door is not provided, it is considered that the door impinges against the outer face of the carbody and damages the carbody.

SUMMARY OF THE INVENTION

The present invention was made in light of the problem mentioned above, and the objective of the invention is to provide an emergency door of a vehicle composed such that the door can be opened without requiring a large space at outside the vehicle, ingress of rainwater is prevented even in a case the emergency door is mounted at a curved profile of the front face of the leading car, the door can be opened easily with small force, and the door is supported rigidly and steadily with compact configuration.

To attain the objective, the present invention proposes a door of a vehicle characterized in that the inner side of the door is pivotally supported at an upper and lower parts thereof respectively by a first and second arms which are pivotally supported by the carbody, further the inner side of the door is pivotally supported by a first link bar which is pivotally supported by the carbody such that; the first arm and the first link bar composes a parallel or near parallel link mechanism, and also the second arm and the first link bar composes a parallel or near parallel link mechanism, by locating the pivot points of the arms and link bar to emergency door at positions shifted along the width direction of the door from the pivot points of the arms and link bar to the carbody respectively.

In the invention, a parallel linkage is composed by the first arm and the first link bar (and a parallel linkage is also composed by the second arm and the first link bar) to enable horizontal shift of the door, the door can be supported steadily without wobbling with a compact supporting mechanism.

As the door can be moved horizontally along the outer profile of front face of leading car, not large space is required at outside the carbody as compared with a single swing door. Further, as hinges are not used, parts interfering with the gasket surrounding the door do not exist, and risk of ingress of rainwater is eliminated. Further, the door is moved horizontally, the door can be opened easily with small human force.

It is preferable that a stopper mechanism to stop the door when it comes to a full open position composed such that; a bracket having an oblong hole is attached to the carbody, an end of a second link bar is pivotally connected to the first link bar and the other end have a pin fixed thereto and accommodated in the oblong hole slidable along the oblong hole;

thereby enabling the emergency door to stop at its full open position when the pin slides and comes to an end of the oblong hole when opening the door.

In this way, the door can be stopped at its full open position with a compact configuration only by providing the second link bar pivotally connected to the first link bar and a bracket having an oblong hole and attached to the carbody. Therefore, improvident contact of the door with the carbody can be prevented.

It is preferable that a third arm is provided of which an end is pivotally supported by the carbody and the other end thereof is pivotally supported by the door at a position between the upper and lower part of the door, and the third arm is shaped to form a handle part for serving to open and close the door.

By this, the door can be supported more rigidly and steadily to the carbody, and close contact of the door to the carbody via a gasket is improved.

It is preferable that the pivot points of the first arm, second arm, and first link bar to the inner face of the door are located at positions across the centerline of the width of the door viewed from the pivot points of the arms and link bar to the carbody.

With this configuration, horizontal shift amount of the door along the front face of the leading car can be increased, so the door can be widely opened.

It is also preferable that a damper device is provided to damp fast and furious movement of the door when opening or closing the door. With this, the door is prevented from being rapidly and violently opened or closed and safety when opening and closing the door is improved.

According to the invention, by composing such that; the inner side of the door is pivotally supported at an upper and lower part thereof respectively by a first and second arms which are pivotally supported by the carbody, further the inner side of the door is pivotally supported by a first link bar which is pivotally supported by the carbody such that; the first arm and the first link bar compose a parallel or near parallel link mechanism, and also the second arm and the first link bar compose a parallel or near parallel link mechanism, by locating the pivot points of the arms and link bar to emergency door at positions shifted along the width direction of the door from the pivot points of the arms and link bar to the carbody respectively; a rigid and steady supporting mechanism of door can be constructed in a very compact manner.

Further, as the door can be shifted horizontally along the front face of the leading car, the door can be opened without requiring a large space outside the carbody as is in the case of a single swing door. As hinges are not used, parts interfering with the gasket at the door edge do not exist, and concern of ingress of rainwater is eliminated. Further, the door is moved horizontally, the door can be opened easily with small human force.

DETAILED DESCRIPTION OF THE PREFERRED EMBODIMENTS

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

The First Embodiment

Figure 1:
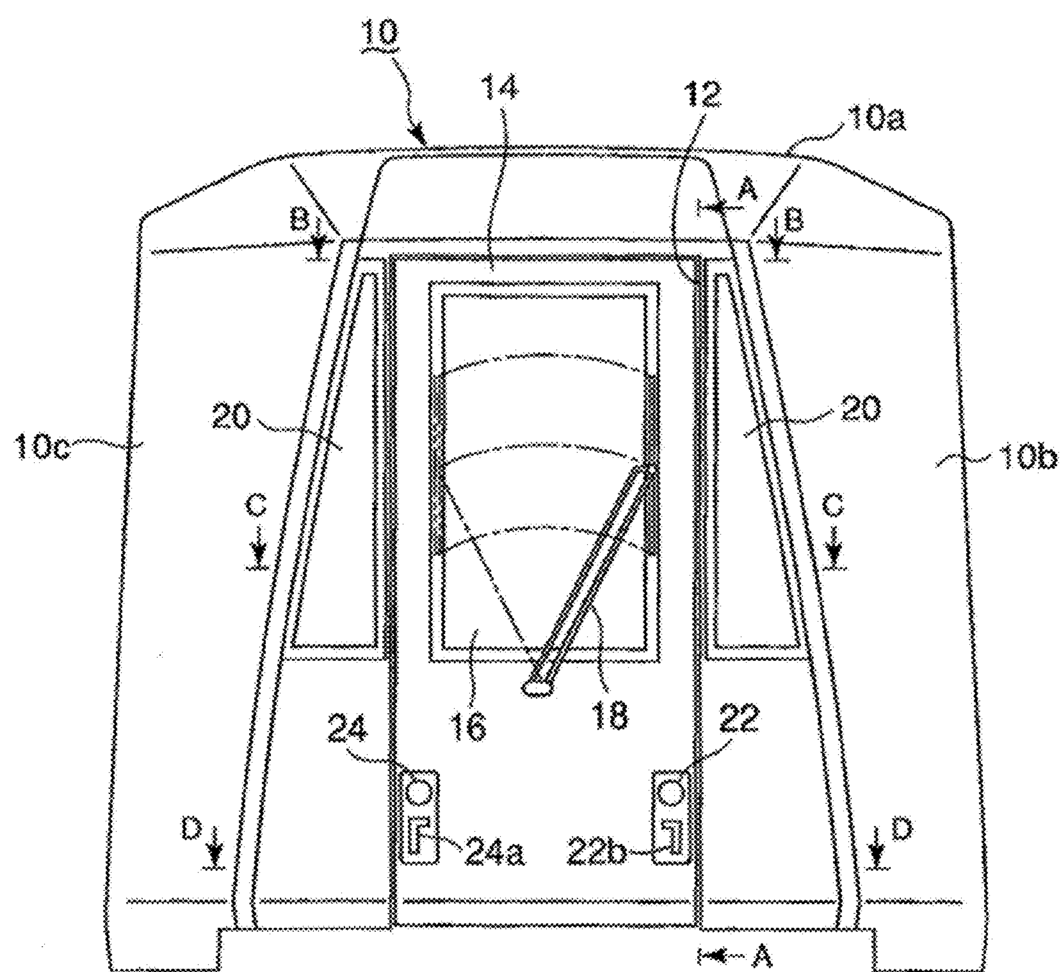
FIG. 1 is a front view of a leading car equipped with an emergency door of the first embodiment of the present invention.

A first embodiment of a vehicle for new transit system equipped with an emergency door of the invention will be explained with reference to FIGS. 1 to 5. FIG. 1 is a front view of a leading car 10. An emergency exit 12 and an emergency door 14 are provided at the center part of the front face of the leading car. A window 16 and a window wiper 18 are provided at the middle part of the emergency door 14. A window 20 is provided to each of front side ends **10*b* and 10*c* adjacent to the emergency exit 12**.

Exterior lock knobs 22 and 24 and exterior operating levers **22*a* and 24*a* are provided at lower parts of the emergency door 14. In the event of an emergency, the emergency door 14 can be unlocked by turning exterior lock knobs 22 and 24, and then opened by operating exterior operating levers 22*a* and 24*a*** as mentioned later.

Figure 2:
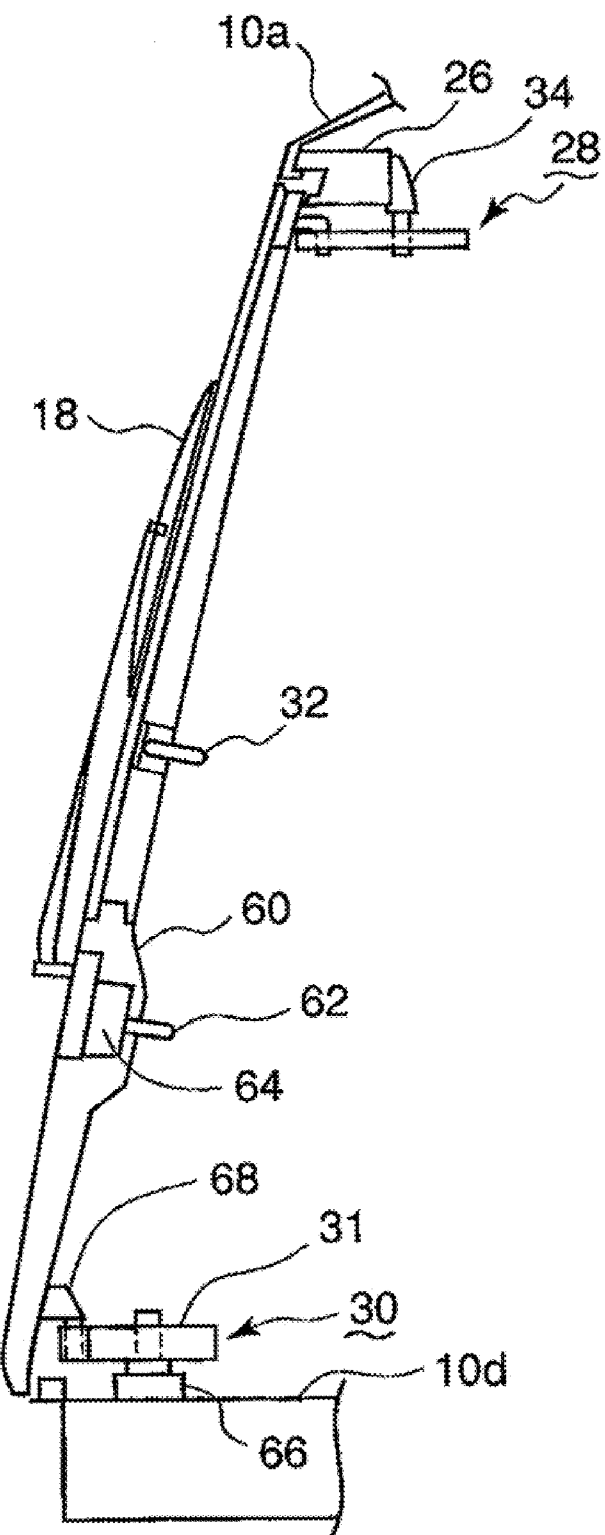
FIG. 2 is a cross sectional view along line A-A in FIG. 1.

Referring to FIG. 2, an upper supporting mechanism 28 for supporting the emergency door to be able to be opened or closed is attached to a supporting frame 26. The emergency door 14 is supported by the upper supporting mechanism 28 and a lower supporting mechanism 30 provided at the bottom part of the emergency door 14 so that it can be moved horizontally between the closed position and opened position. A handle 32 is attached to the interior of the emergency door at a middle part thereof.

Hereunder, composition of the upper supporting mechanism 28 will be explained with reference to FIG. 3.

Figure 3:
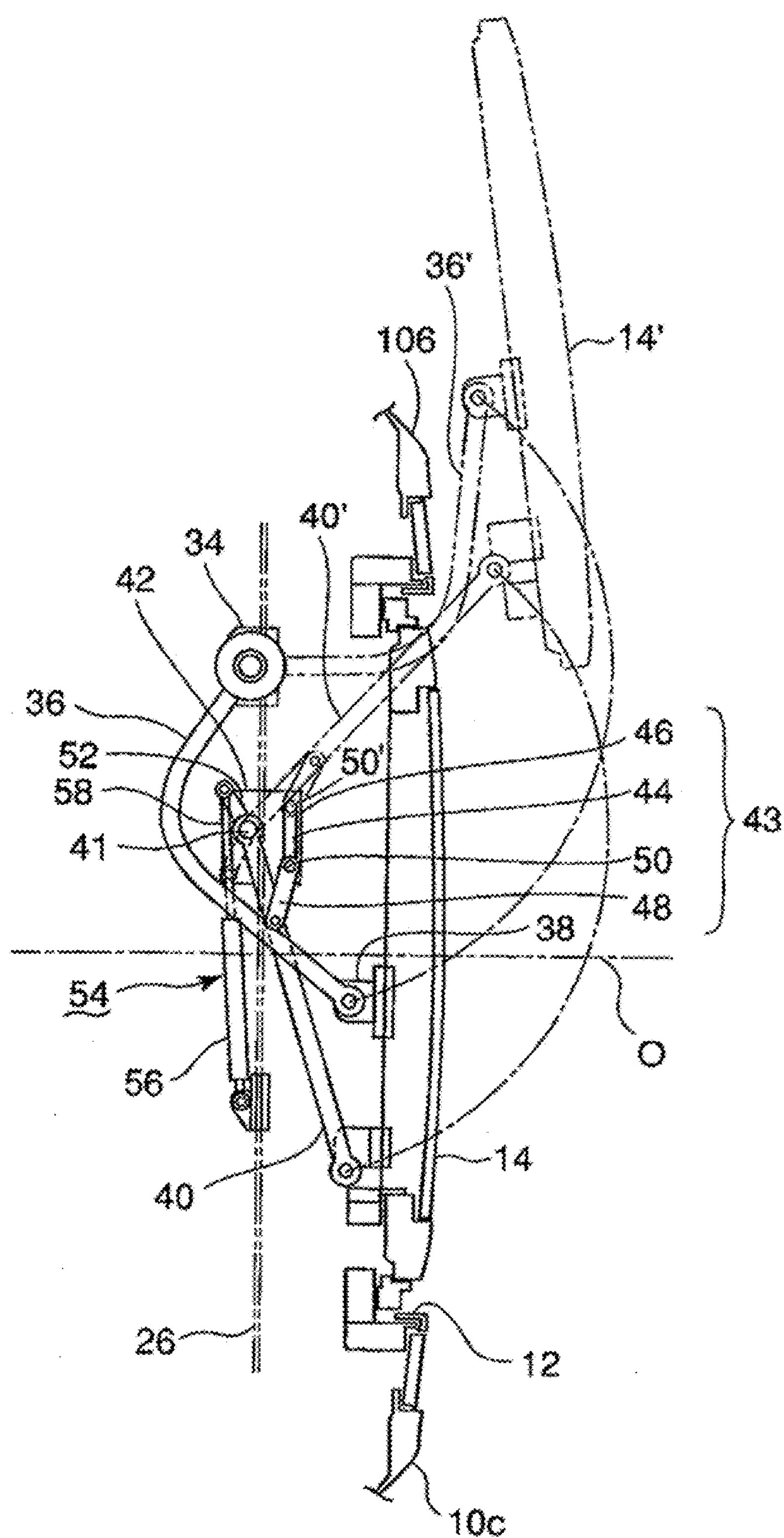
FIG. 3 is a cross sectional view along line B-B in FIG. 1.

In FIG. 3, an end of an upper bent arm 36 is pivotally supported by a shaft fixed to a bracket 34 attached to the supporting frame 26. The other end of the upper bent arm 36 is pivotally supported by a shaft fixed to a bracket 38 attached to the interior of the emergency door 14. An end of a first link bar 40 is pivotally supported by a support shaft 41 fixed to a bracket 42 attached to the supporting frame 26, and the other end of the first link bar 40 is pivotally attached to the interior of the emergency door 14.

The pivot points of the upper bent arm 36 and the first link bar 40 to the interior of the emergency door 14 are positioned at points opposite from the bracket 34 and 42 fixed to the upper supporting frame 26 across a center line O of the emergency door 14.

A seat block 46 having an oblong hole 44 is attached to the upper supporting frame 26. An end of a second link bar 48 is pivotally attached to the first link bar 40, and a pin 50 fixed at the other end of the second link bar 48 is engaged in the oblong hole 44 for sliding therein.

As shown in FIG. 3, the pin 50 is positioned at the left end of the oblong hole 44 when the emergency door 14 plugs the emergency exit 12. When the emergency door 14 is moved to a position 14' as shown by chain double-dashed lines to fully open the emergency door 14, the pin 50 is moved to the other end of the oblong hole 44 as indicated by a reference numeral 50' to be stopped there. The emergency door 14 can be stopped at the full open position. The seat block 46 having the oblong hole and the second link bar having the pin 50 compose a stopper mechanism 43 in this way.

The first link bar 40 has an extended part 52 extending at a certain angle from the end part pivotally supported by the support shaft 41. To the extended part 52 is pivotally connected an end of a piston rod 58 of a gas damper of which the end of the cylinder 56 is pivotally connected to the supporting frame 26.

Movement of the emergency door 14 when opened or closed is damped by the gas damper 54.

Figure 4:
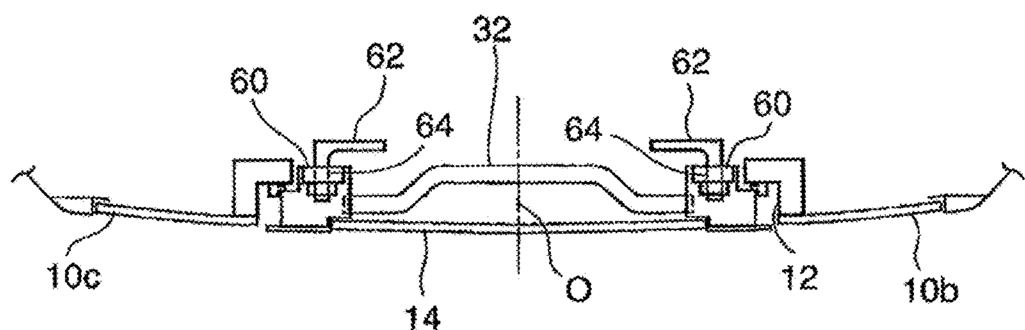
FIG. 4 is a cross sectional view along line C-C in FIG. 1.

Next, configuration around the handle 32 will be explained referring to FIG. 4. In FIG. 4, both ends of the handle 32 are supported by seat blocks 60 fixed to the interior of the emergency door 14. To each of the seat blocks 60 fixed to the interior of the emergency door is attached a locking device 64 to unlock the emergency door 14 and interior operating lever 62 to open the emergency door 14. The emergency door 14 can be opened when interior lock knobs are turned to an unlock position and then interior operating levers are turned to an open position.

Figure 5:
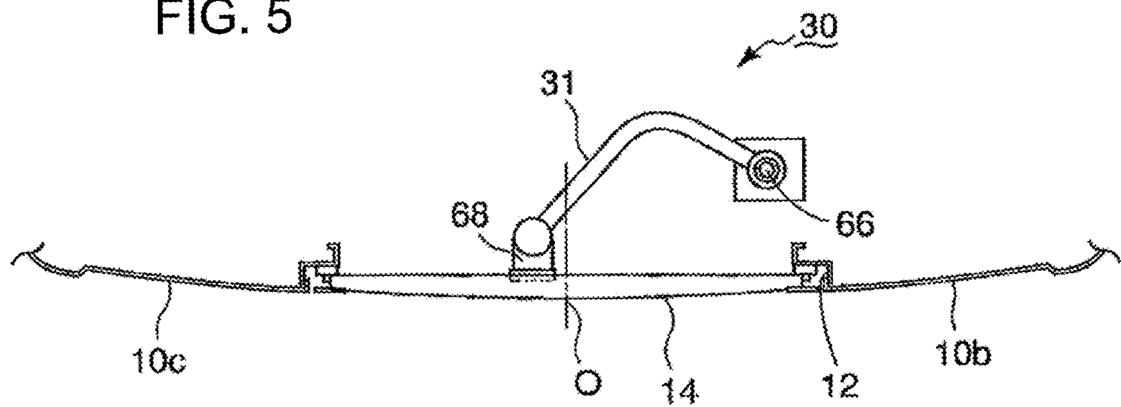
FIG. 5 is a cross sectional view along line D-G in FIG. 1.

Next, configuration of the lower supporting frame 30 will be explained referring to FIG. 5. In FIG. 5, an end of a lower bent arm 31 is pivotally supported by a support shaft 66 fixed to a supporting frame 10*d*(see FIG. 2). A bracket 68 is attached to a lower part of the interior of the emergency door 14, and the other end of the lower bent arm 31 is pivotally supported by a support shaft fixed to the bracket 68. The bracket 68 is positioned at a place across the center line O of the emergency door directly bellow the bracket 38.

When the need arises to allow the passengers to escape through the emergency exit 12 by opening the emergency door 14 in the event of an emergency such as occurrence of train trouble, a crewman or other personnel inserts keys into the keyholes 22 and 24 from outside the vehicle or a crewman or passenger in the vehicle turns the handles 62 to unlock the locking devices 64.

Then the emergency door 14 can be moved horizontally by pushing the door outward by grasping the handle 32.

As the pivot point of the first link bar 40 to the emergency door 14 is offset horizontally from the center line connecting the pivot point of the upper bent arm 36 and that of the lower bent arm to the emergency door 14, a parallel linkage is constructed.

As shown in FIG. 3, With this construction, the emergency door 14 can be moved horizontally from the closed position shutting the emergency exit 12 to the fully opened door position 14' fully opening the emergency exit 12.

The upper bent arm 36 and lower bent arm 31 are bent such that they do not interfere with the front side end 10*b* when the emergency door 14 is moved horizontally from the closed position to fully opened position. As the pivot points of the upper bent arm 36, lower bent arm 31, and first link bar 40 to the emergency door 14 are positioned at positions over the center line of the emergency door 14 from the positions they are pivotally connected to the upper supporting frame 26, the emergency door 14 can be easily moved to the full open position.

As the emergency door 14 can be move horizontally nearly along the front side end 10*b*, large space is not required outside the vehicle for the emergency door 14 to move from the closed position to the opened position as compared with the case of a single swing door. Therefore, even when the emergency door is provided to the front end of a vehicle connected to a rear end of another vehicle, the emergency door can be moved to open the emergency exit without interfering with the rear face of the adjacent front vehicle. When a rescue vehicle having an emergency door according to the invention is connected to the rear of another vehicle, the emergency door of the rescue vehicle can be easily opened.

As the emergency door 14 is supported by two set of parallel linkage composed by the upper bent arm 36, lower bent arm 31, and first link bar 40 (the first link bar 40 works as a mate link for both bent arms 36, 31), interference of the emergency door 14 with the front side end 10*b* due to wobbling of the door 14 does not occur.

The emergency door 14 can be moved horizontally via the upper bent arm 36, lower bent arm 31, and first link bar 40, so the operator can move the door lightly with small force without exerting force to support the weight of the door.

As the emergency door 14 can be stopped at the full open position 14' thereof without fail by the stopper mechanism 43, a condition like the emergency door 14 being over the full open position 14' and contacting against the carbody does not occur.

As the upper supporting mechanism 28 is located above the upper end of the emergency exit 12, it will not be impeditive for passengers to escape through the emergency exit 12.

As parts like hinges are not attached to the periphery of the emergency door 14, waterproof design of the door is facilitated, and problems of intrusion of rainwater, etc. do not occur.

The Second Embodiment

Figure 6:
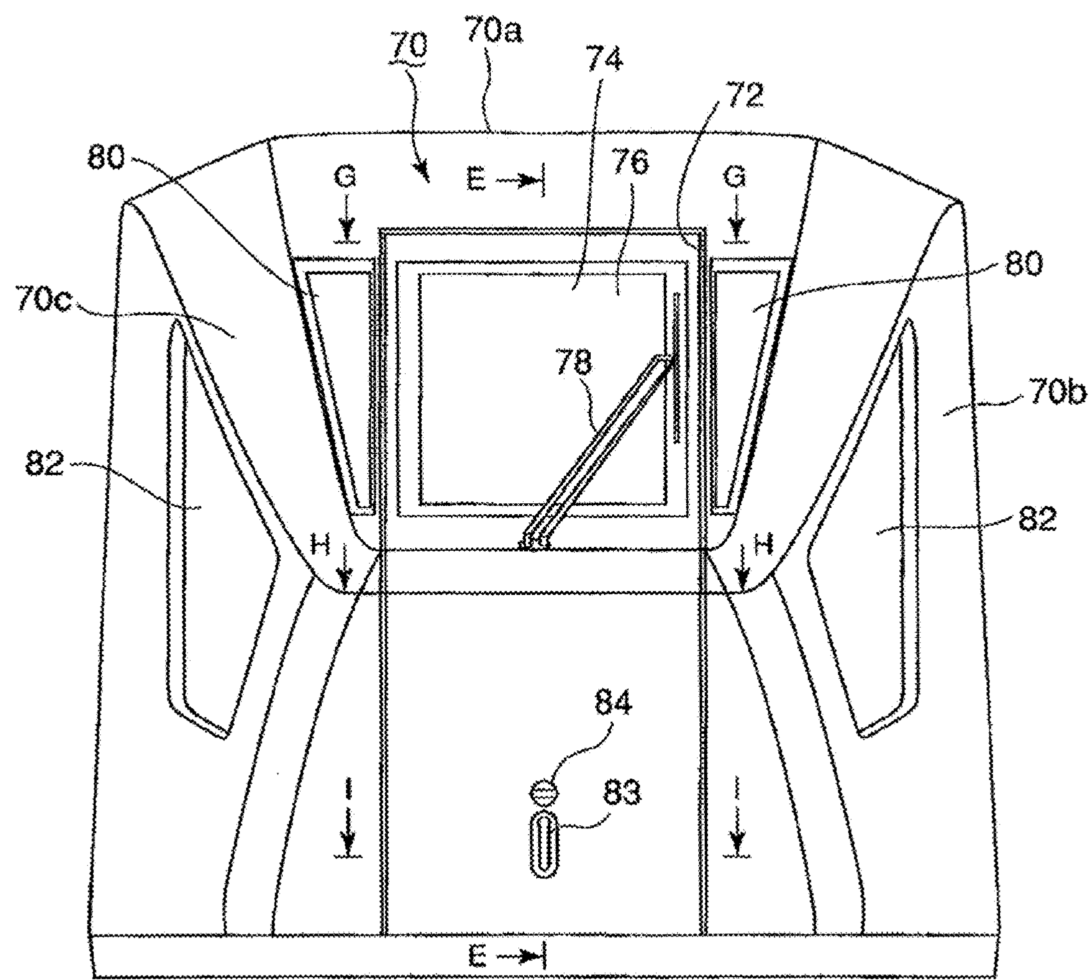
FIG. 6 is a front view of a leading car equipped with an emergency door of the second embodiment of the invention.

Next, a second embodiment of the invention will be explained with reference to FIGS. 6-12. FIG. 6 is a front view of a leading vehicle 70. An emergency exit 72 is provided at the center part of the front end, and an emergency door 74 to cover the emergency exit 72 is provided. A window 76 is provided in the upper part of the emergency door 74, and a wiper 78 is provided outside the window 76. Windows 80 and 82 are provided to each of front left and right wall 70*b* and 70*c*. In the lower part of the emergency door 74 is provided an exterior operating lever 83 for opening a latch and lock mechanism 88 mentioned later and exterior unlock knob 84 for making the operation of the lever 83 possible.

In the event of an emergency, the exterior operating lever 83 is made possible to be operated by turning the exterior unlock knob 84, the latch and lock mechanism 88 is released from outside the door 14. In this state, the emergency door 74 can be moved.

Figure 7:
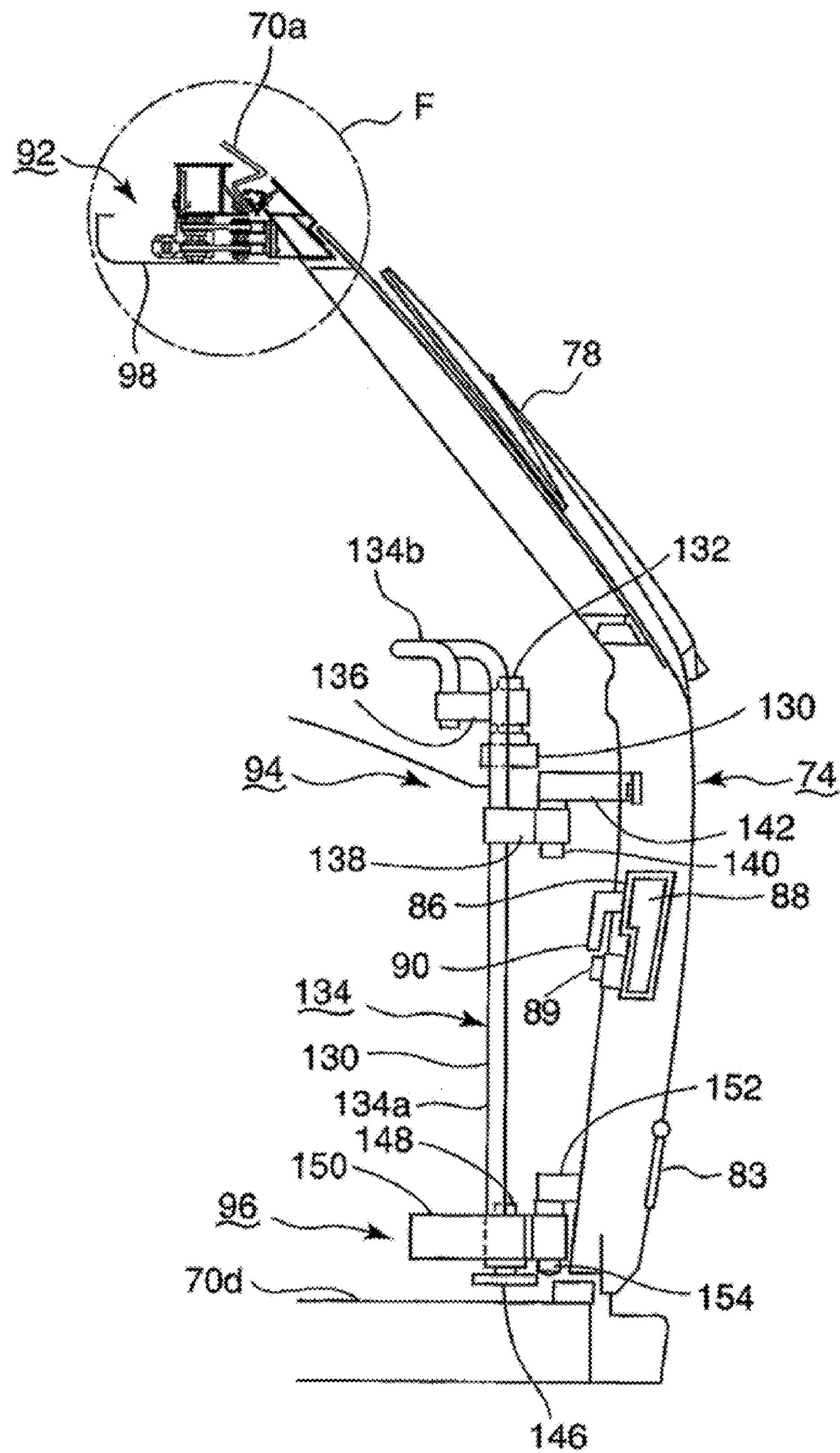
FIG. 7 is a cross sectional view along line E-E in FIG. 6.

In FIG. 7, an accommodation case 86 is attached to the inner face of the emergency door 74. In the case 86 is accommodated the latch and lock mechanism 88 to lock the emergency door 74 in a closed position. Interior unlock knob 89 and interior operating lever 90 are attached to the accommodation case 86. By releasing the locking state of the door locked by the latch and lock mechanism 88 by operating the interior lock knob 89 and then turning the interior operating handle 90, the emergency door 74 can be brought to a state possible to be moved to open the emergency exit.

As shown in FIG. 7, the emergency door 74 is supported to be possible to be moved horizontally by means of an upper supporting mechanism 92, a middle supporting mechanism 94, and a lower supporting mechanism 96. Hereunder, structure of the upper supporting mechanism 92 will be explained referring to FIGS. 8 and 9.

Figure 8:
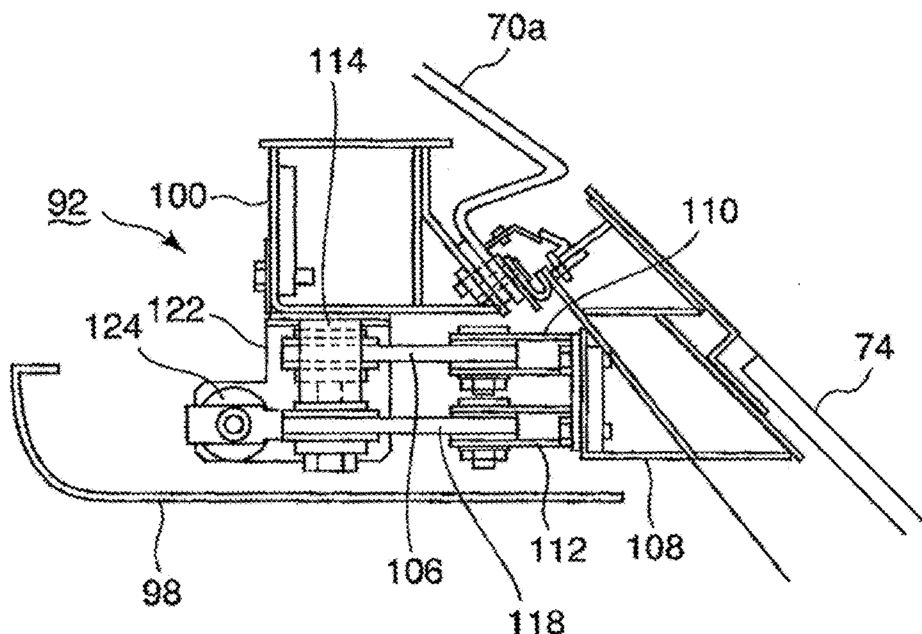
FIG. 8 is an enlarged detail of a portion encircled by a circle F.
Figure 9:
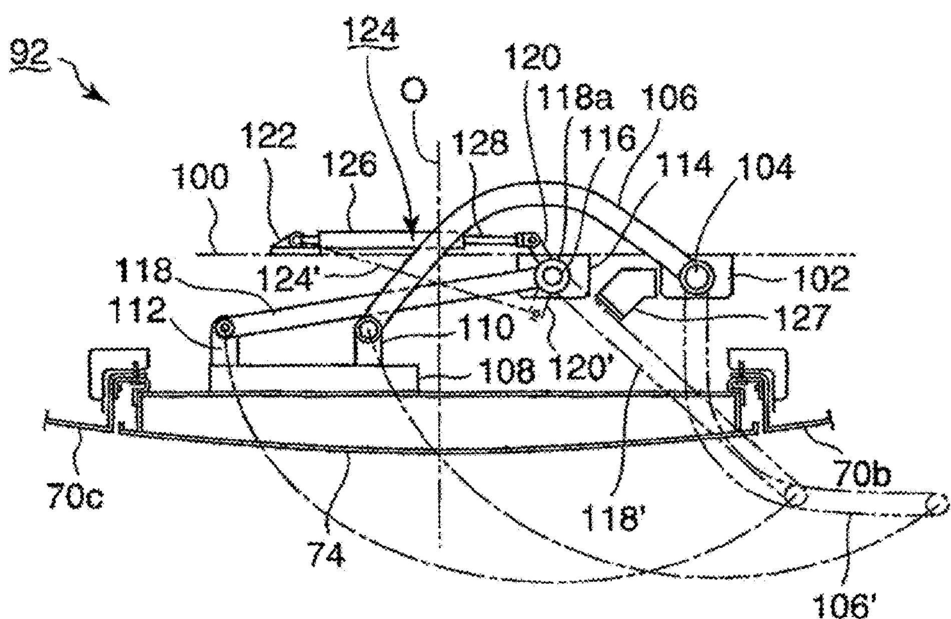
FIG. 9 is a cross sectional view along line G-G in FIG. 6.

In FIGS. 8 and 9, the upper supporting mechanism 92 is provided between the roof 70*a* of the leading car 70 and a ceiling 98 under a roof 70*a*. The roof 70*a* is fixed to the supporting frame 100 extending horizontally. A seat block 102 is fixed to the underside of the supporting frame 100. An end of an upper bent arm 106 is pivotally supported by a support shaft 104 fixed to the seat block 102.

A seat block 108 is fixed to the interior of the emergency door 74 and a bracket 110 and 112 are attached to the seat block 108. The other end of the upper bent arm 106 is pivotally supported by a support shaft fixed to the bracket 110.

A seat block 114 is fixed to the underside of the supporting frame 100 apart a certain distance from the seat block 102 toward a link bar 118 which is pivotally supported by a support shaft 116 fixed to the seat block 114. The other end of the link bar 118 is pivotally supported by a support shaft fixed to the bracket 112. A connecting bar 120 is fixed to the end 118*a* of the link bar 118 at a certain angle with the link bar 118. A bracket 122 is fixed on the upper side of the supporting frame 100, and the cylinder 126 of a gas damper 124 is pivotally connected to the bracket 122. The piston rod 128 of the gas damper 124 is pivotally connected to the connecting bar 120.

A stopper 127 is attached to the supporting frame 100 between the seat block 102 and 114 so that rotation of the link bar 118 is restricted by the stopper 127. Rotation of the link bar 118 is restricted by the stopper when the emergency door 74 is moved to a position to fully open the emergency exit 72. When the emergency door 74 comes to the full open position, the link bar 118, connecting bar 120, and gas damper 124 come to the positions indicated respectively by reference numerals 118', 120', and 124'.

The pivot points of the upper bent arm 106 and link bar 118 to the emergency door 74 are located at positions across the center line O of the emergency door 74 viewed from the pivot points of them to the upper supporting frame 100.

Next, the middle supporting mechanism 94 will be explained referring to FIG. 7 and FIG. 10. In the drawings, a bracket 130 is fixed to a frame forming the periphery of the emergency exit 72 of the leading car 70. A vertical shaft 132 is fixed to the bracket 130. An end of a connecting bar 134 of round section is pivotally connected via a bracket 136 to the vertical shaft 132. The connecting bar 134 has a vertical portion 134*a* and a horizontal portion 134*b* which serves as a handle portion.

Figure 10:
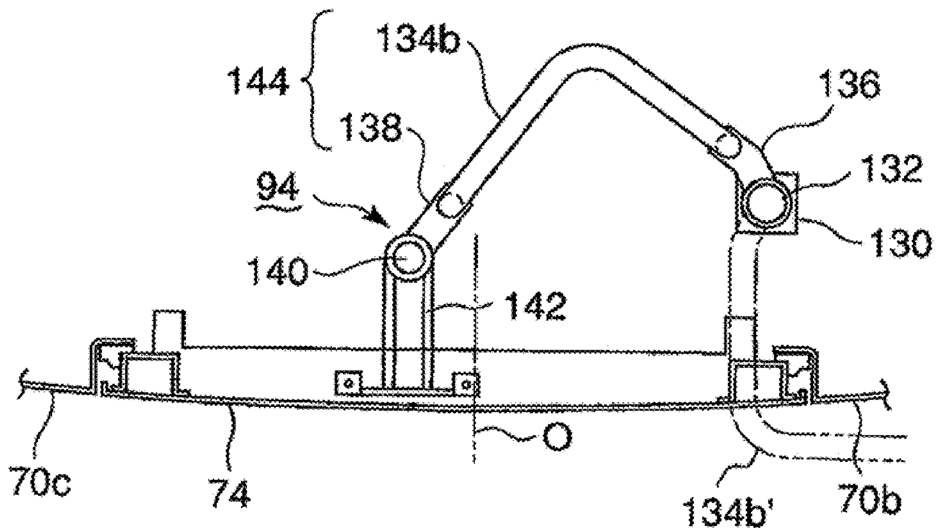
FIG. 10 is a cross sectional view along line H-H in FIG. 6.

The horizontal handle portion 134*b* is bent as shown in FIG. 10, and its end part is bent in the vertical direction and fixed to a bracket 136 which is pivotally connected to the vertical shaft 132 fixed to the bracket 130. The vertical portion 134*a* of the connecting bar 134 passes through a through hole at an end of a bracket 138 of which the other end is pivotally engaged with a shaft 140 fixed to a bracket 142 which is attached to the interior of the emergency door 74. The handle part 134*b* and the bracket 138 form a middle arm 144.

The shaft 140 which is the pivotal connecting point of the middle arm 144 to the emergency door 74 is located at a position across the center line O of the emergency door 74 viewed from the pivotal connecting point of the middle bent arm 144 to the vertical shaft 132 which is the axis of rotation of the middle bent arm 144.

Figure 11:
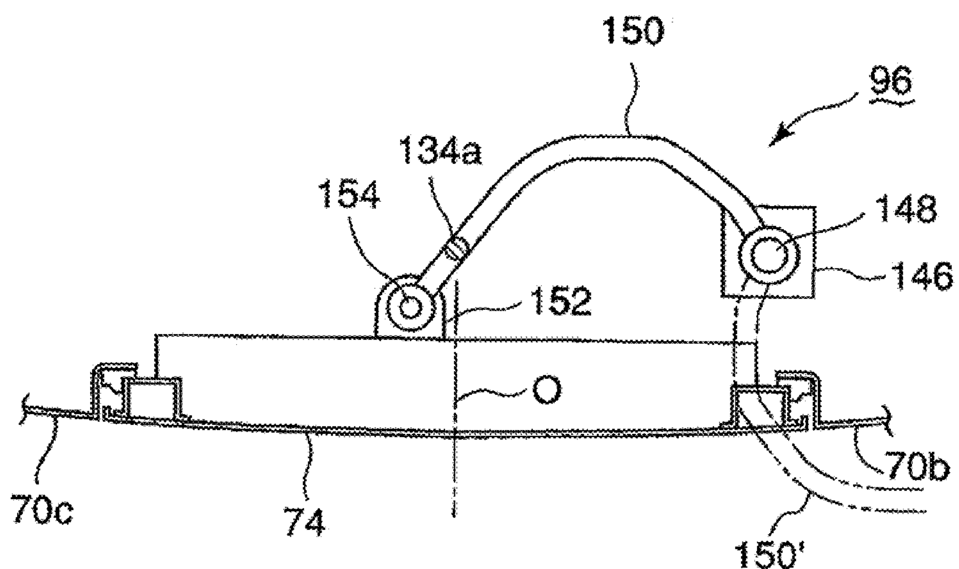
FIG. 11 is a cross sectional view along line I-I in FIG. 6.
Figure 12:
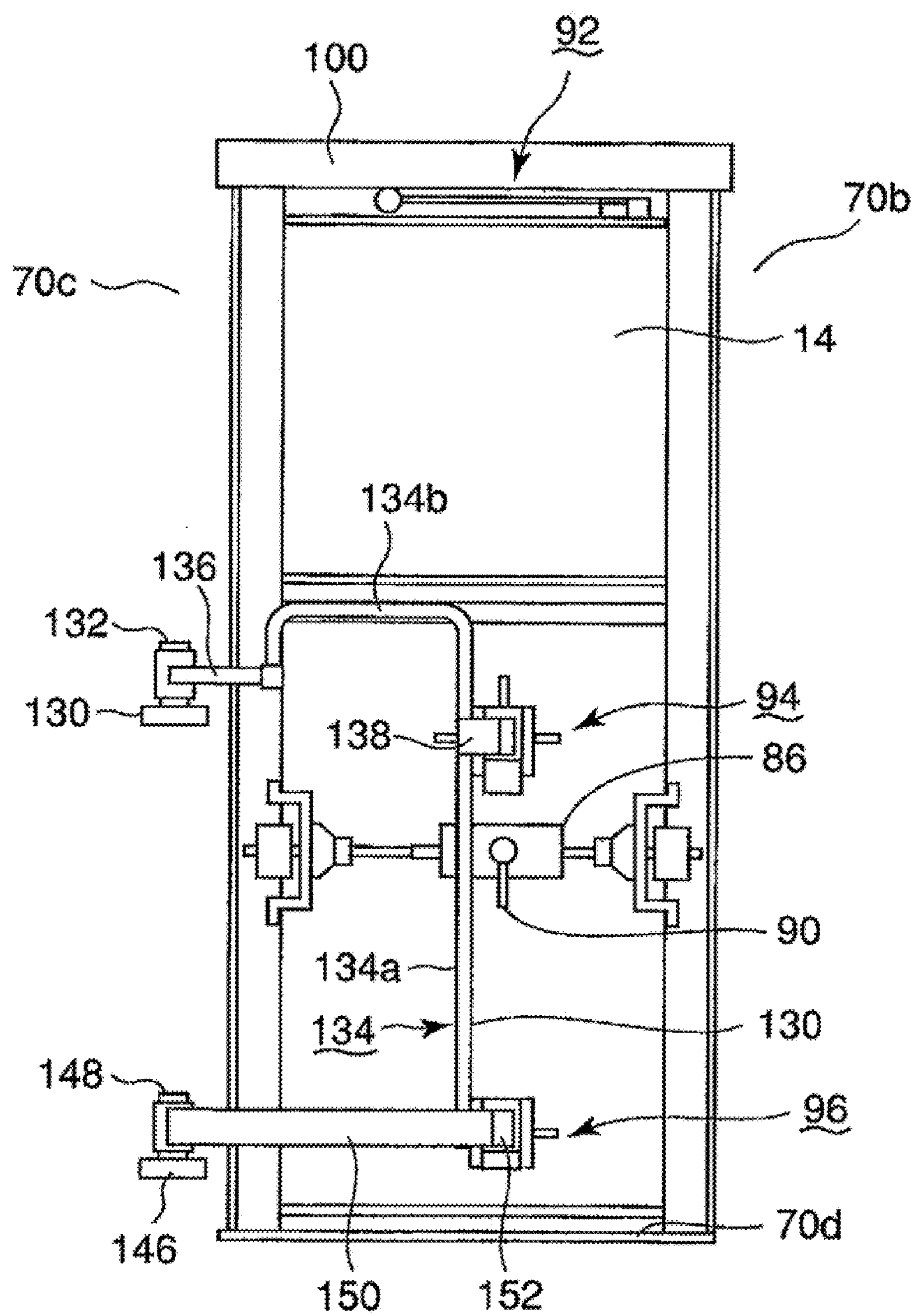
FIG. 12 is a rear elevation of the emergency door of FIG. 6 vied in the inside of the car.

Next, the lower supporting mechanism 96 will be explained referring to FIG. 7 and FIG. 11. A bracket 146 is fixed to a frame forming the emergency exit 72 above supporting frame 70*d*. A vertical shaft 148 is fixed to the bracket 146. An end of a lower bent arm 150 is pivotally supported by the vertical shaft 148 and the other end thereof is pivotally supported by a shaft 154 fixed to a bracket 152 attached to the rear face of the emergency door 74. To the lower bent arm 150 is connected the vertical part 134*a* of the connecting bar 134. The lower bent arm 150 can be moved horizontally to swing about the vertical shaft 148.

The pivot point of the lower bent arm 150 to the emergency door 74 is located at a position across the center line O of the emergency door 74 viewed from the pivot point of the lower bent arm 150 to the vertical shaft 148.

The middle bent arm 144 and lower bent arm 150 are connected with the connecting bar 134 so that the bent arms can support the emergency door 74 with sufficient rigidity. With the configuration, the mass of the emergency door 74 can be supported by a set of combined arms of the middle bent arm 144 and lower bent arm 150 connected with the connecting bar 134 with more rigidly as compared with a case the bracket 138 and the carbody side end of the lower bent arm 150 are supported by the vertical shafts 140 and 148 respectively individually, and distortion of the middle bent arm 144 and lower bent arm 150 due to the mass of the emergency door 74 is reduced, as a result the emergency door 74 can be opened and closed smoothly.

With the configuration, the latch and lock mechanism 88 can be unlocked from both outside and inside the car to bring the emergency door in a state it can be opened in the event of an emergency. Then, the emergency door 74 can be opened by grasping the handle 140 and pushing it so that the handle portion 134*b* and the lower bent arm 150 are turned horizontally to a position as indicated by a reference numeral 134*b*' and to a position indicated by a reference numeral 150' respectively. Or, the emergency door can also be opened by turn and pull the exterior operation lever 83.

In the embodiment, the pivot points of the middle bent arm 144 and lower bent arm 150 to the emergency door 74 are located at the same position in plan view, that is, the line connecting the two pivot points is vertical, and the pivot point of the link bar 118 to the emergency door 74 is located at a position across the center line O of the emergency door 74 viewed from the pivot points of the upper bent arm 106 and link bar 118 to the upper supporting frame 100. As the upper bent arm 106, in fact, a straight line connecting the pivot points of the upper bent arm 106 to the bracket 110 fixed to the emergency door 74 and the seat block 102 fixed to the upper supporting frame 100, and the straight link bar 118 compose a parallel linkage in this way, the emergency door 74 can be moved horizontally, and action and effect the same as those of the first embodiment can be attained.

As the pivot points of the upper bent arm 106, middle bent arm 144, lower bent arm 150, and link bar 118 to the emergency door 74 are located across the center line O thereof viewed from the pivot points of those to the carbody, the emergency door 74 can be moved easily to the full open position.

In addition, by providing the middle bent arm 144, the emergency door 74 can be supported steadfastly without distortion of the three supporting arms 106, 144, and 150 even when the emergency door is very heavy. Further, although the front face of leading car 70 becomes rather complicated, parts such as hinges, etc. are not attached to the periphery of the emergency door 74, so watertightness design of the door is facilitated, and problems of ingress of rainwater, etc. does not occur.

As the handle part 134*b* is provided to the middle supporting mechanism 94, the force of the operator to open the emergency door can be exerted to open the door easily without fail and at the same time the operator can move the emergency door with his/her attitude maintained steadily.

Further, the emergency door can be stopped at the full opened position by the stopper 127, which is simpler in configuration as compared with the stopper mechanism 43 of the first embodiment, resulting in decreased manufacturing cost and improved equipment in maintenance service.

According to the invention, a door for a guided vehicle composed such that not large space outside the vehicle is required to open the door, ingress of rainwater is prevented, configuration is simple, and opening and closing operation thereof is facilitated.

The invention claimed is:

1. A door of a vehicle, wherein an interior of the door is pivotally supported at an upper and lower part thereof respectively by a first and second arms which are pivotally supported by a carbody, and the interior of the door is pivotally supported by a first link bar which is pivotally supported by the carbody such that;

the first arm and the first link bar compose a parallel or near parallel link mechanism, and also the second arm and the first link bar compose a parallel or near parallel link mechanism, by locating the pivot points of the arms and link bar to the door at positions shifted along the width direction of the door from the pivot points of the arms and link bar to the carbody respectively.

2. A door of a vehicle according to claim 1, wherein a stopper mechanism to stop the door when the door comes to a full open position composed such that;

a bracket having an oblong hole is attached to the carbody, an end of a second link bar is pivotally connected to the first link bar and the other end has a pin fixed thereto and received in the oblong hole slidable along the oblong hole, thereby enabling the door to stop at the full open position of the door when the pin slides and comes to an end of the oblong hole when opening the door.

3. A door of a vehicle according to claim 1, wherein a third arm is provided of which an end is pivotally supported by the carbody and the other end thereof is pivotally supported by the door at a position between the upper and lower part of the door, and the third arm is shaped to form a handle part for serving to open and close the door.

4. A door of a vehicle according to claim 1, wherein the pivot points of the first arm, second arm, and first link bar to the interior of the door are located at positions across the center line of the width of the door viewed from the pivot points of the arms and link bar to the carbody.

5. A door of a vehicle according to claim 1, wherein a damper device is provided to damp fast and furious movement of the door when opening or closing the door.

* * * * *